April 1, 1952 — C. B. DALE — 2,591,515

PHONOGRAPH

Original Filed Dec. 15, 1949 — 6 Sheets-Sheet 1

INVENTOR.
Colin B. Dale

April 1, 1952     C. B. DALE     2,591,515
PHONOGRAPH Original Filed Dec. 15, 1949     6 Sheets-Sheet 2

INVENTOR.
Colin B. Dale

April 1, 1952 C. B. DALE 2,591,515
PHONOGRAPH
Original Filed Dec. 15, 1949 6 Sheets-Sheet 3

Fig.5.

INVENTOR.
Colin B. Dale
BY
Bunning & Bunning
Attys:

Patented Apr. 1, 1952

2,591,515

UNITED STATES PATENT OFFICE 2,591,515

PHONOGRAPH

Colin B. Dale, Oak Park, Ill., assignor to Webster-Chicago Corporation, Chicago, Ill., a corporation of Illinois Original application December 15, 1949, Serial No. 133,168. Divided and this application January 13, 1950, Serial No. 138,473

6 Claims. (Cl. 274—10)

The main objects of this invention are to provide an improved construction and arrangement of the several parts of and operating mechanisms for a phonograph; to provide an improved form and operation of mechanism for automatically returning the tone arm to starting position and resetting it, and simultaneously effecting the actuation of the record-release means to permit a successive playing of a plurality of records; to provide an improved construction and arrangement of cam means for effecting the operation of the tone arm return and record-release actuating mechanism; and to provide an improved form of record-changing phonograph in which the various parts of each mechanism are so combined, and the several mechanisms are so coordinated, as to make it very economical to manufacture, simple and positive in control and operation, and highly efficient in tone reproduction.

A phonograph embodying this invention comprises a support A mounting a motor-driven record-supporting turntable B, a reciprocating tone-reproducing arm C, and a record support and release means D wherewith is associated a speed-changing and switch-actuating mechanism E, a tone arm retracting and record-release actuating mechanism F, and a manually operable record-release actuating means G which also serves as a starting means for the phonograph.

Support for the operating mechanism

The support A comprises a base 31 in the form of a plate upon which is arranged all of the mechanism for the present phonograph, including a pltaform 32, a record spindle 33, a tone arm post 34, and a motor 35.

The base 31 herein shown as rectangular is provided with reinforcing flanges 36 along its lateral edges, and with certain struck-out lugs, fingers, shoulders, and certain openings, as will be noted hereinafter in the descriptions of the several mechanisms. At one corner the base 31 suspends a plate 37 whereto is attached the motor 35. This suspension involves the use of rubber cushions 38 (see Figs. 5 and 6) in order to reduce to a minimum the transmission of motor vibrations to the record-supporting turntable B. Adjacent this suspension of the motor plate 37, the base plate is depressed, as shown at 39, and recessed in order to better provide for mounting of the turntable drive pulley 40 which forms a part of the speed-change and switch-control mechanism E.

Figure 3:
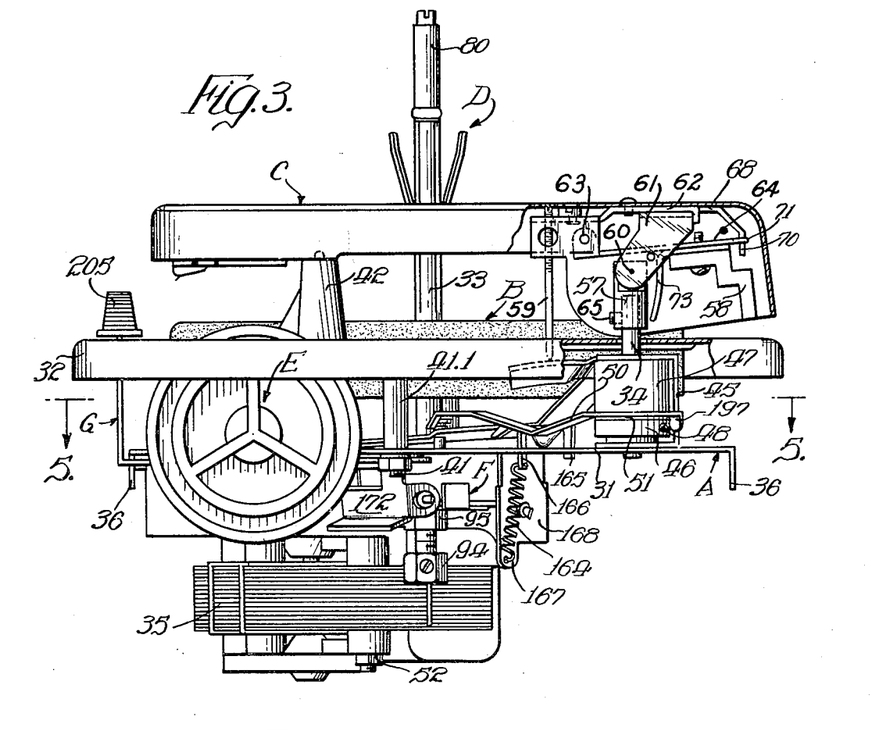
Fig. 3 is an elevational view thereof, a part of the tone arm being broken away so as to more clearly illustrate the arrangement of the counterbalancing weight therefor.
Figure 5:
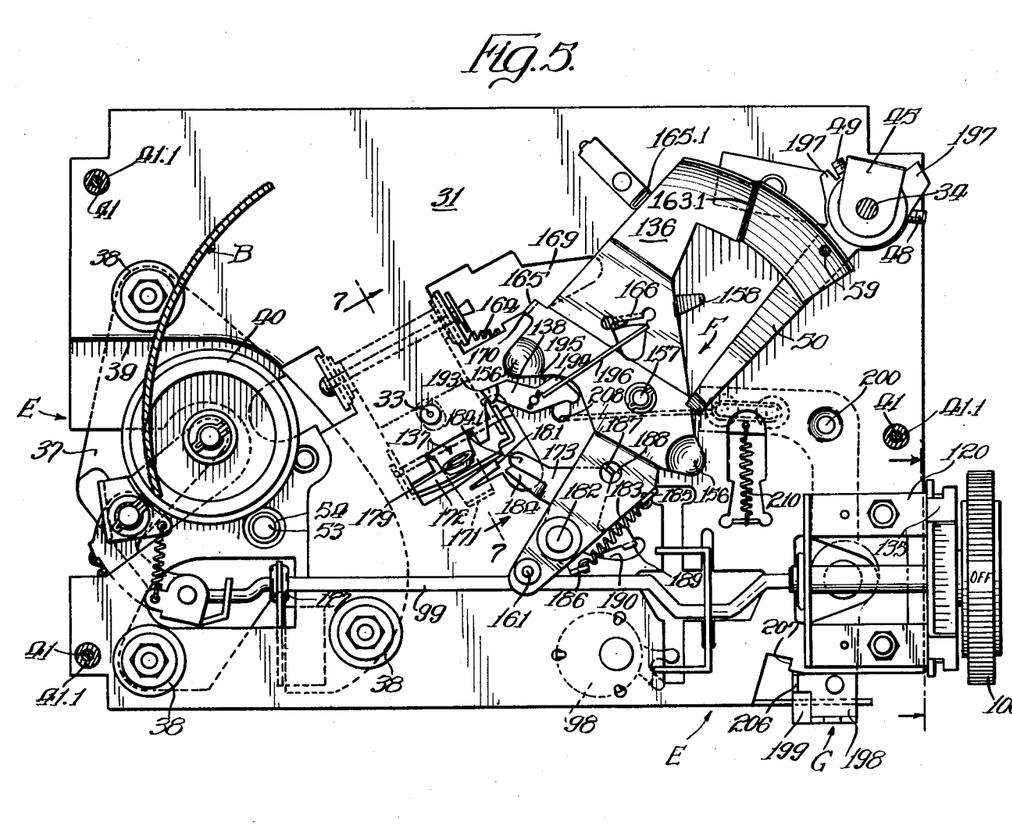
Fig. 5 is an enlarged plan view of the several operating mechanisms in their normally inoperative positions, as viewed from the plane of line 5—5 of Fig. 3, immediately prior to the placing of the tone arm in position for reproducing a record.
Figure 6:
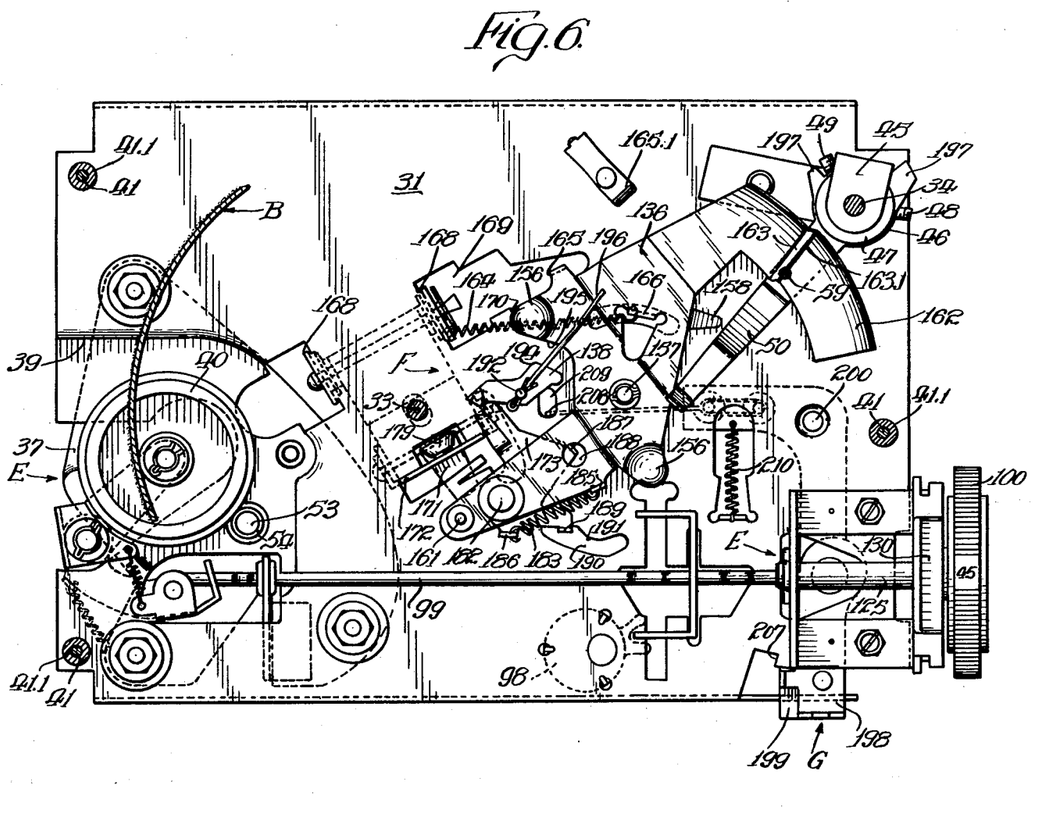
Fig. 6 which is a view similar to Fig. 5 shows the parts in the positions to which they have shifted incidentally to returning the tone arm to its starting position preparatory to playing a concurrently-released record.

The platform 32 is in the form of a plate supported in spaced relationship to the base 31 by bolts and nuts 41 and bushings 41.1 (see Figs. 3, 5 and 6). The platform 32 mounts a tone arm rest 42. The spindle 33 is supported on the base 31 near its middle by a nipple 43 on to which it is secured to the base by a nut 44 (see Figs. 7 and 8).

The post 34 which mounts the tone arm C is rotatably mounted on a U-shaped bracket 45 secured adjacent one corner of the base 31, and has associated therewith a collar 46 and a bushing 47. The collar 46 is keyed to the post 34 and has headless screws 48 and 49 (see Figs. 5 and 6) which abut the opposite edges of the vertical part of the bracket 45 to limit swinging movement of the tone arm C.

The bushing 47 holds a feeler arm 50 (forming a part of the tone arm return and record-release actuating mechanism F which is to be described more fully hereinafter) in contact with a friction pad 51 resting on the collar 46, the purpose of which will be explained at a later point.

Figure 2:
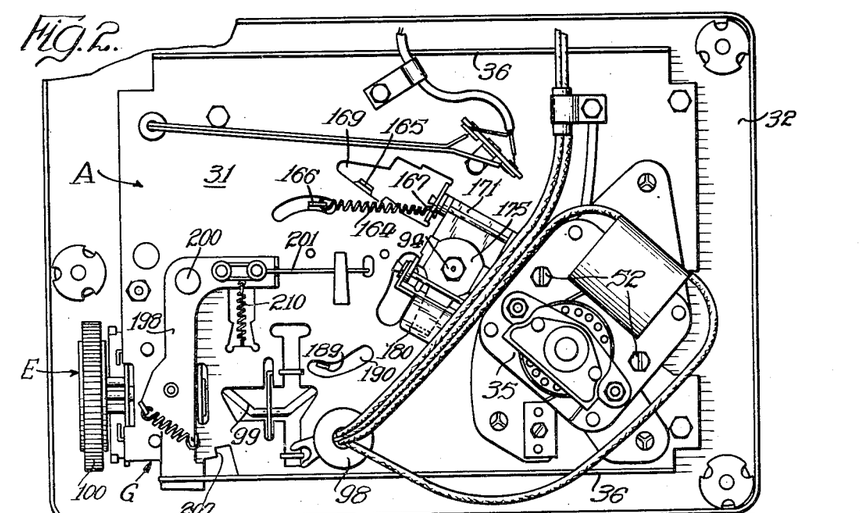
Fig. 2 is a bottom or under side view of the same, the view being reversed 180 degrees from that of Fig. 1.

The motor 35 may be of any type suitable for this purpose. As herein shown, it is attached to the under side of the plate 31 by suitable bolts and nuts 52 (see Figs. 2 and 3) so as to locate the drive shaft 53 of the motor 35 in position for contact by the turntable drive pulley 40 (see Figs. 5 and 6). The drive shaft 53 is formed with an enlargement 54 at its upper end, preferably by pressing thereon a short section of a wire spring of suitable diameter and gauge wire. This enlargement and the shaft directly below provide hubs of slightly differing diameters wherewith the turntable drive pulley 40 coacts to operate the turntable B at two different speeds.

The turntable

The turntable B is in the form of a flanged casting mounting on its under side a cam disc 55 (see Figs. 4, 7, 8, 10, 11 and 12). The cam forms a part of the tone arm retracting and record-release actuating mechanism F to be presently described. In the hub of the disc is fixed a bushing 56 whereby the turntable is journaled on the spindle 33 (see Figs. 7 and 8). A suitable covering of friction material, such as flock, is spread over the top and flange of the turntable B so as to ensure the holding of a record in rotative contact therewith.

The tone arm

Figure 1:
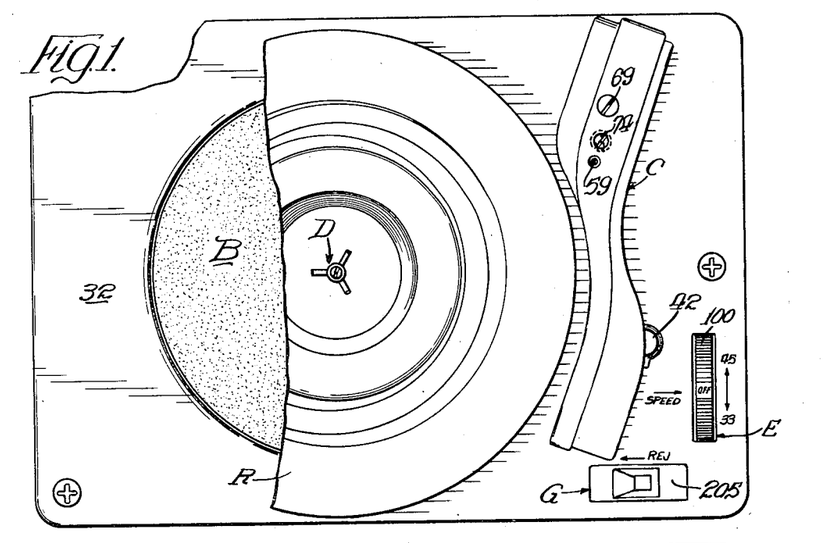
Figure 1 is a plan view of an improved speed-altering, record-changing phonograph embodying this invention, the tone-reproducing arm being in the rest position, and a part of the record being broken away so as to show the record-supporting turntable.

The tone arm C is in the form of a light metal casting somewhat S-shaped (see Fig. 1) at the forward end of which is mounted a suitable recording stylus (see Fig. 3). At its rear end is hinged a mounting hub 57 and a counterweight 58. A pin 59 attached to the tone arm C forwardly of the hub 57 coacts with the tone arm return and record-release mechanism F to secure a return to starting position and also a reset of the tone arm C, as will be subsequently explained.

The mounting hub 57 is keyed to a pin 60 which is journaled on a fork 61 attached to a bracket 62 secured to the inner rear end of the tone arm C. To the bracket 62 is hinged at 63 an arm 64 on the outer end of which is secured the counterweight 58, all as indicated in my Patent No. 2,579,175 dated December 18, 1951. A set screw 65 on the hub 57 permits it to be removably keyed to the post 34 so as to turn therewith.

The pin 59 is threaded onto the bracket 62 forwardly of the pivot 63 of the arm 64. It is adapted to be engaged by the tone arm retracting and record-release mechanism F, as will be indicated presently.

The record support and release means

A record support and release means D suitable for use with the present tone arm reciprocating mechanism C is fully disclosed in my Patent No. 2,579,175 and comprises the spindle 33 wherein is an axially shiftable control rod 81 connected to the tone arm return and record-release actuating mechanism F. The rod 81 (see Figs. 7 and 8) mounts on its lower end a pair of collars 94 and 95. The collar 94 is secured directly to the rod 81 by a set screw 96, and the collar 95 which is threaded on to the collar 94 is secured in place by a set screw 97. The adjustment of these collars 94 and 95 relative to each other and to the rod 81 permits and insures the correct action of the rod 81 to release a record by the tone arm retracting and record-release actuating mechanism F.

The speed-changing and switch-actuating mechanism

The speed-changing and switch-actuating mechanism E comprises the turntable drive pulley 40, a current switch 98, and a crank-shaft 99 mounting a dial 100, whereby the energizing or de-energizing of the motor 35 is synchronized with the shifting of the pulley 40 into and out of engagement with the motor drive shaft 53 or its hub enlargement 54. The detail structure and functioning of this mechanism is disclosed in my Patent No. 2,579,175 aforesaid.

The tone arm return and record-release actuating mechanism

The tone arm return and record-release actuating mechanism F comprises the cam disc 55 on the underside of the turntable B, a tone arm retracting plate 136, and a record-release shifting means 137. These are respectively actuated by two of the cam tracks formed in the cam disc 55, as will be presently explained, and wherewith they are brought into engagement by the coaction of a tripper 138 under the influence of the feeler 50 controlled by swinging movement of the tone arm C.

The cam disc 55, in this particular embodiment, is formed with the hub cam tracks 140 and 141 and a ring cam track 142, respectively (see Figs. 4, 7, 8, 10, 11, and 12), constructed to effect (a) a horizontal movement, (b) a vertical movement, and (c) a combination vertical and horizontal movement. The coaction of these parts with the tripper 138, the record-release shifting means 137, and the plate 136, accomplish two co-ordinated results: namely, the return of the tone arm C to starting position, after it has completed the reproducing of a record, and the release of a record for subsequent reproduction.

The cam track 140 (see Figs. 4, 10 and 11) which is formed on the periphery of the hub of the cam disc 55 includes a quadrant extension 143 providing shoulders 144 and 145 of which the former constitutes the high point. During each revolution of the turn table B this quadrant extension 143 serves to slightly push back and immobilize the tripper 138 until it is so activated by the feeler 50, or the manually operable record-release actuating means G, as to positively swing its outer end into the path of the shoulder 145, whereupon the tripper 138 initiates the swing of the tone arm retracting plate 136 and the record-release shifting means 137, as will be explained subsequently.

The cam track 141 is formed on the end of the hub of the cam disc 55. It is provided with a gradual incline circumferentially of the hub from a low point 146 to a high point 147 and with a sudden descent from its high point to its low point (see Fig. 4). This cam surface is also inclined radially inwardly and upwardly (see Figs. 7 and 8) for a purpose presently to be explained. Coacting with the record-release shifting means 137, this cam track 141 effects a depression of the rod 81 for actuating the record support and release means D.

Figure 4:
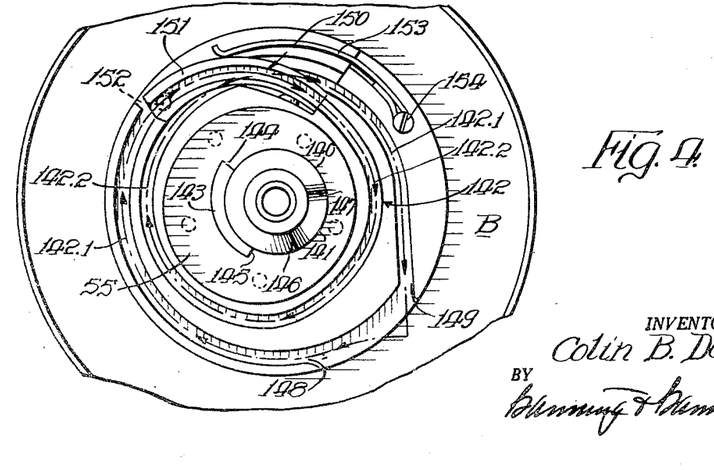
Fig. 4 is an enlarged under side view of the turntable, showing the three tracks of the cam for the tone arm retracting and record-release actuating mechanism, and by arrows diagramming the path of the cam track follower which effects a lifting of the tone arm and its return to, and resetting at, starting position.
Figure 10:
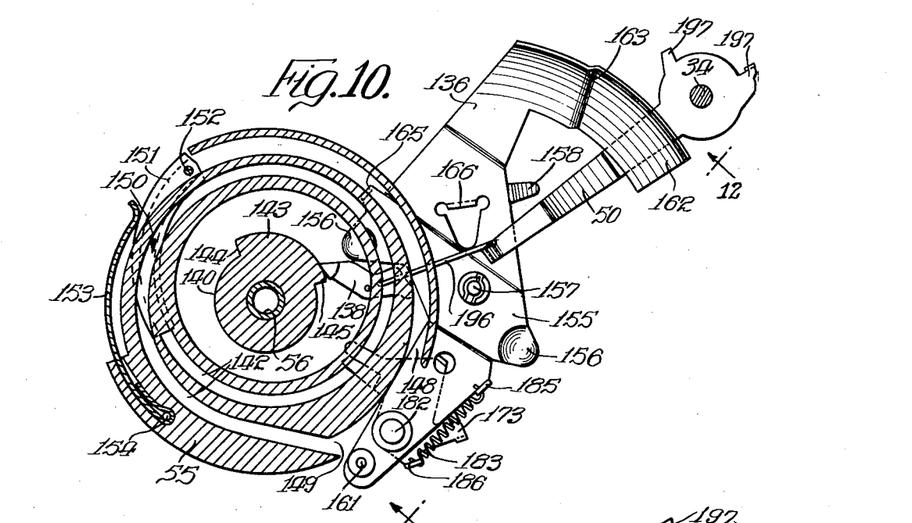
Fig. 10 is a cross-sectional plan view of the turntable cam for the tone arm retracting and record-release actuating plate, as viewed from a plane below the top of said turntable, showing the form of the tracks of the cam and the relative position of the plate immediately prior to shifting thereof to initiate its engagement with the cam track which subsequently effects elevation of the tone arm as it completes playing of the record and causes its return to starting position.
Figure 11:
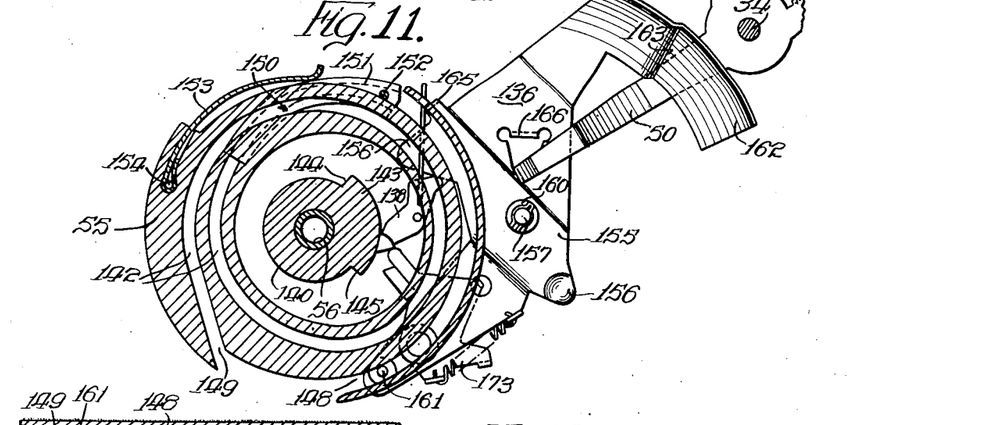
Fig. 11 which is a similar view shows the relative positions of the cam and plate as they begin their engagement to effect return of the tone arm and actuation of the record-releasing mechanism.
Figure 12:
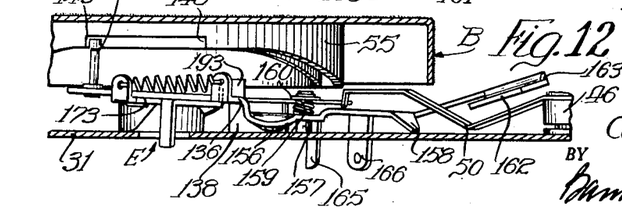
Fig. 12 is a side elevation of the aforesaid cam and plate, taken on line 12—12 of Fig. 10, showing the record turntable in section.

The cam track 142 is formed by the junction of opposite spirals extending inwardly and gradually inclined axially upwardly from peripheral entrance and exit openings 148 and 149 and crossing each other at different levels substantially opposite the openings 148 and 149, so as to constitute inner and outer portions 142.1 and 142.2 which over-pass and under-pass each other at 150 (see Figs. 4, 10, and 11.)

A section 151 of the cam disc 55, at the point 150 of the over- and under-passing of the cam track portions 142.1 and 142.2, is hinged at 152 so that it may be retracted to permit a cam follower on the tone arm retracting plate 136 (after traversing the inner portion 142.2) to retract said section 151 and follow the under-pass approach to the outer track portion 142.1. A leaf spring 153 which is anchored at 154 normally shifts the section 151 to align its inner end with the inner track portion 142.2.

The tone arm actuating plate 136 is substantially a bell crank lever, somewhat broadened at its middle part 155. At the opposite sides of this broadened part are formed embossments 156 which coact with a pivot pin 157 to so support the plate 136 as to permit its swinging in a horizontal plane about the vertical axis of the pivot pin 157, and its tilting in a vertical plane about a shifting horizontal axis which extends through the points of contact of the embossments 156 on the base 31 and a contiguous groove 163.1 disposed radially of the plate pivot. A lug 158 on the arm 136 also contacts the base 31 and coacts with the embossments 156 to provide for this combination shifting and tilting movement of the plate 136 on the base 31.

The pin 157 extends through an aperture in the plate 136 slightly larger than the diameter of the pin 157 so as to permit the tilting action and the swinging movement just described. A spring 159 interposed between the plate 136 and a washer 160 on the pin 157 normally holds the plate 136 with the embossments 156 and the lug 158 in contact with the base 31, and yieldingly resists the vertical tilting of the plate 136.

Secured at one end of the plate 136 is a cam track follower pin 161 and at the opposite end of this plate is formed an integral arcuate shaped extending arm 162 formed intermediately of its ends with a transverse ledge 163. This arcuate arm 162 is adapted to engage the pin 59 to elevate the tone arm C and return it to its starting position, as a result of the cam follower pin 161 being brought into engagement with the cam track 152, as will be explained more fully hereinafter.

A spring 164 (see Figs. 3, 5, and 6) urges the plate 136 toward its normal or retracted position (see Fig. 5), as limited by stops 165 and 165.1. The spring 164 has one end attached to a lug 166 struck out from the plate 136 and extending down through a slot in the base 31 (see dotted outline of slot in Fig. 6). The other end of the spring 164 is connected to an ear 167 on the end of one of a pair of lugs 168 struck out from the base 31, forming a support for the record-release shifting means 137, presently to be described.

The stop 165 is in the form of a finger struck down from the edge of the plate 136 and extending through an opening 169 (formed by the striking out of the adjacent lug 168 from the base 31) and abuts a shoulder 170 (see Figs. 5 and 6) jutting into said opening 169. The stop 165.1 is an angle piece having one leg secured to the base 31 so that its upright leg is contacted by the edge of the plate 136 practically simultaneously with the contact of the finger 165 against the shoulder 170.

The record-release shifting means 137 (see Figs. 7 and 8) comprises a rocker arm 171, a detent 172, and a detent-tipping and trigger-restoring finger 173. The rocker arm 171 is pivoted at 174 between the pairs of lugs 168 and rests upon a spring 175 (see Fig. 9) which is supported on the collar 95. Normally the arm 171 is held by the tension of a spring (not shown) with the angularly disposed end 176 abutting the bottom of the base 31.

Figure 7:
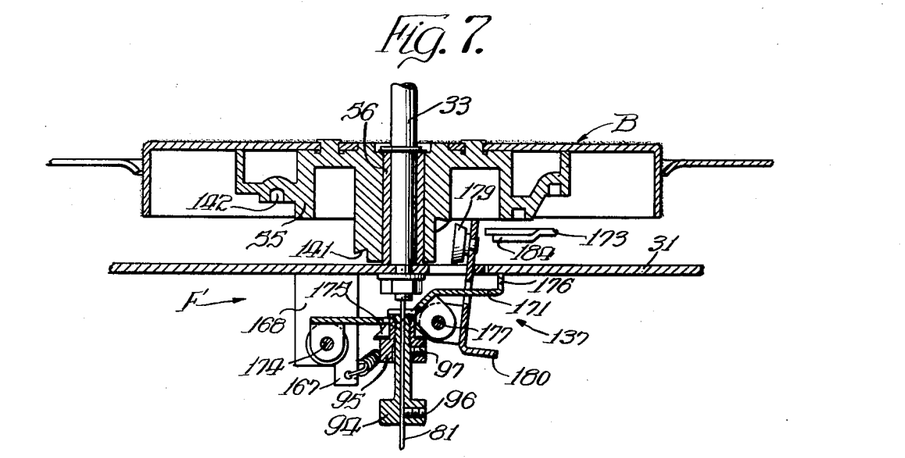
Fig. 7 which is an enlarged, cross-sectional, elevational view of the record-releasing mechanism, shows the parts immediately prior to their being shifted to release a record, the view being taken in the plane of line 7—7 of Fig. 5.
Figures 8, 9:
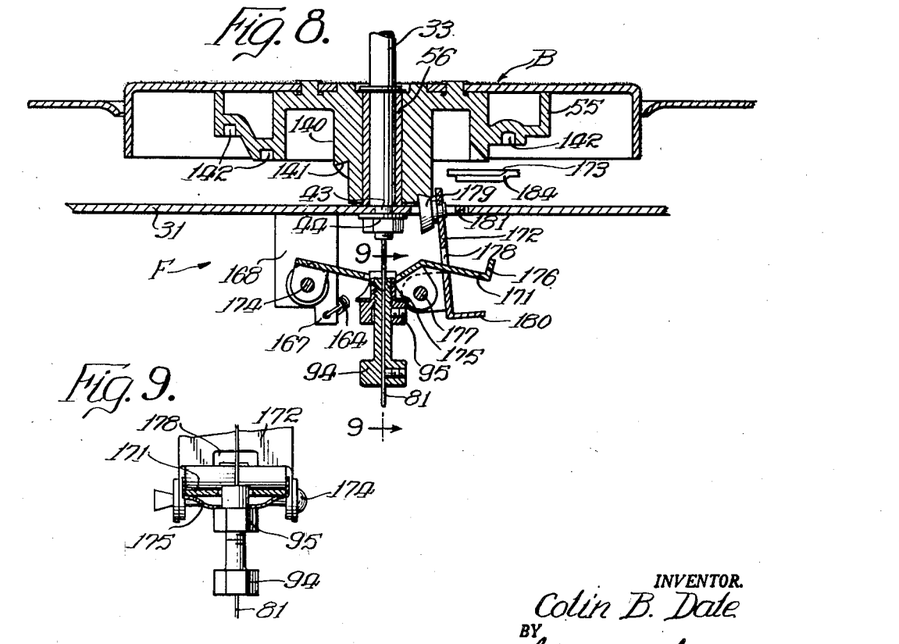
Fig. 8 is a similar view showing the above mechanism in its record-releasing position.
Fig. 9 is a detail view, taken on line 9—9 of Fig. 8.

The detent 172 is pivoted at 177 to the arm 171 with the outer end of the arm 171 extending through a slot 178 in the detent 172 (see Figs. 7 and 8). At its upper end the detent 172 mounts a roller 179. The periphery of the roller is tapered to conform to the inward and upward inclination of the cam track 141. This insures the roller 179 remaining in contact with the cam track during the rotation of the turntable B for effecting the retraction of the fingers 75 and the consequent release of a record R. At its lower end the detent 172 is provided with an extension which serves as a counterweight 180 and tends normally to tilt the detent 172 back out of the path of the cam track 141 and against a shoulder 181 (see Fig. 5) formed on the base 31. The disposition of this shoulder 181 may optionally be altered so that it will arrest retraction of the detent 172 to locate the roller 179 at the desired distance away from the cam track 141.

The detent-tipping and trigger-restoring finger 173 is in the nature of a small bell crank lever pivoted at 182 on the under side of the plate 136 adjacent the cam follower pin 161 (see Figs. 5, 6, 10, and 11). The finger 173 is disposed by a spring 183 so that shoulders 184 and 184.1 respectively contact the detent 172 and the tripper 138. When the plate 136 initiates its inward swinging movement, the shoulder 184 shifts the detent 172 inwardly against the action of the counterweight 180 to engage the cam roller 179 with the cam track 141. As the plate 136 completes its inward swinging movement, the shoulder 184.1 contacts the tripper and restores it to its normal position. The spring 183 is fastened at one end to a lug 185 on the plate 136 and a lug 186 on the finger 173.

A lug 187 struck up from the finger 173 extends through an aperture 188 in the plate 136 and limits the swinging movement of the finger 173 on its pivot 182. A second lug 189, struck down from the tipping finger 173, moves in a slot 190 in the base 31. The lug 189 is so positioned as to pass over the ledge 191 incident to the plate 136 being swung on the pivot pin 157 to enter the cam follower pin 161 into the opening 148 of the cam track 142, and concurrently shift the detent 172 to engage the roller 179 with the cam track 141, whereupon the tipping finger 173 is shifted on its pivot 182 to disengage the shoulder 184 from contact with the detent 172 (see Fig. 6), the cam roller 179 meanwhile having been retentively engaged by the cam track 141.

The tripper 138 is in the nature of a bell crank lever pivoted at 192 on the base 31 and is formed with a V-shaped cam 193 at one end for contacting the cam track 140, and with a cam shoulder 194 at the other end for contacting a cam surface 195 on the tone arm retracting plate 136 (see Fig. 5). The tripper 138 also mounts a finger 196 which is adapted to coact with the feeler 50 to effect an initial shifting of the plate 136 a sufficient distance to engage the cam track follower 161 with the cam track 142.

The tripper 138 is normally positioned, as shown in Figs. 5, 6, and 10, with the cam surface 195 against the cam shoulder 194, so long as the plate 136 is in its normally retracted position, and with the face 193.1 of the cam 193 contactable by the outer periphery of the quadrant section 143 of the cam track 140. However, the pivot of the tripper 138 is such that the point of the cam 193 can traverse a radius inwardly of the depressed surface of the cam track 140. Thus, if at any time, when it is not contacted by the face of the quadrant 143, the tripper 138 is shifted to locate the tip of the cam 193 in the path of the shoulder 145, said tripper will be swung on its axis and cause a swinging of the plate 136 for the purpose above mentioned.

The feeler 50 is in the form of an angularly shaped, light metal arm swingably supported on the tone arm post 34. Its function is to swing the tripper 138 so as to move the cam 193 into the path of the cam shoulder 145 when said cam is not immobilized by reason of its contact with the cam quadrant 143. The feeler 50 is positioned between the bushing 44 and the friction pad 51 resting on the collar 46. Thus, as the tone arm C swings back and forth, it causes a rotation of the friction pad 51 and, by reason of the weight of the bushing 47, causes the finger 50 to move with the tone arm. However, if in its swinging movement the feeler 50 strikes an obstruction which cannot yield to the friction contact of the feeler with the tone arm C as, for example, the tripper 138 when held inactive by the cam quadrant 43, the continued movement of the tone arm C will cease to affect the movement of the feeler 50. The feeler 50 is of such a length that its outer end is in the path of the finger 196 when the tone arm C moves toward the inner limit of its swing in response to tracking of its stylus in a record R. Shoulders 197 are formed on the base of the feeler 50 and spaced apart circumferentially so that their contact with the edges of the bracket 45 limit the opposite swinging of the feeler 50.

*The manually operable record-release actuating means*

The manually operable record-release actuating means G (see Figs. 1, 5 and 6) comprises a right angle bell crank lever 198 mounted on one of its arms a locking pawl 199 and coacting therewith to permit the tripper 138 to be actuated to effect a release of a record R at any time. If the tripper 138 is not immobilized, the release of a record will be immediate with a shifting of the lever 198. If, however, the tripper 138 is immobilized, the bell crank lever 198 will be retained in tripper-acting position by the pawl 199 until the tripper 138 has been freed, whereupon the lever 198 will be instantly actuated to effect a release of a record. The detail arrangement and functioning of these parts is fully set forth in my Patent No. 2,579,175 aforesaid.

*Operation*

The operation of this improved phonograph insofar as it relates to the tone arm return and record-release actuating mechanism is as follows:

Let it be assumed that a stack of records R has been placed on the spindle 33 and that the dial 100 is in the "off" position, as shown in Fig. 5. In this position the switch 98 is open so that there is no current flowing to the motor, and the lever 107 is consequently in an intermediate position which locates the pulley 40 in contact with the "off" post 114 (see Fig. 5).

Since none of the mechanisms will operate until the turntable B is rotating, the first step will be to turn the dial 100 from the "off" position to either the "33" or "45" position. Such a turning of the dial will cause the cams 122 and 123 to simultaneously swing and shift the lever 107 and the slide 117 (see Figs. 5, and 6). The horizontal swinging of the lever 107 on the pin 108 and its simultaneous vertical shifting thereon moves the pulley 40 to bring the friction ring 102 into contact with either the motor post 53 or its enlarged hub part 54 and the friction ring 104 into contact with the inner face of the turntable flange. Whether the pulley 40 engages the motor post 53 of hub 54 depends upon whether the shift of the dial 100 is to the left or the right, as viewed from Fig. 3. The shift of the dial 100 to the left would result in the turntable B operating at 33 R. P. M.; the shift to the right would result in its operating at 45 R. P. M.

The simultaneous shifting of the slide 117 by action of the crank 123 would close the switch 98 and thus energize the motor 35, the dial 100 having been shifted to secure the operation of the turntable B at either of the aforesaid speeds.

In order to position a record on the turntable B for sound reproduction, the button 205 is shifted to the left, as viewed from Figs. 5 and 6. This actuates the lever 198 so as to swing the pin 208 into contact with the tripper 138. If, perchance, at the instant of such shifting of the lever 198, the cam surface 193.1 of the cam 193 of the tripper 138 should be in contact with the cam quadrant 143 (see Fig. 10), the tripper 138 would be immobilized. In such circumstances the lever 198 would not move on its pivot 200. However, the pawl 199 would swing and shift on the pin 204 so as to bring the shoulder 206 into engagement with the shoulder 207, and in this position the parts would be held by the spring 210 during the period of temporary immobilization of the tripper 138.

As soon as the turntable B moves the shoulder 144 beyond the point of the cam 193 of the tripper 138, the tripper 138 is swung on its pivot 192 into the position to be engaged by the cam shoulder 45. Thereupon the continued rotation of the turntable B causes the cam shoulder 145 to further shift the tripper 138 sufficiently to cause the cam shoulder 194, bearing against the cam shoulder 195 on the plate 136, to swing the plate 136 horizontally on the pin 157 so as to move the cam track follower 161 into position to be engaged by the cam track 142 through the opening 148 (see Fig. 11). This initial swinging of the plate 136 moves the finger 173 to contact the shoulder 184 with the detent 172 (see Fig. 5). Thereupon the detent 172 is caused to tilt on its axis 177 to bring the cam roller 179 into retained engagement with the cam track 141 (see Fig. 8). As a consequence, continued rotation of the turntable B depresses the lever 171 against the action of the spring 175 and exerts a downward pull on the rod 81. As an incident to this operation, when the cam track follower 161 is picked up by the cam track 142, a further movement of the plate 136 disengages the shoulder 184 of the finger 173 from contact with the detent 172, as most clearly appears in Fig. 5.

Downward pull on the rod 81 results in the lowermost record R being released for gravity descent onto the turntable B in the manner set forth in my Patent No. 2,579,175 aforesaid.

As the turntable B completes one revolution, following engagement of the cam roller 179 with the cam track 141, the roller 179 is released and the rod 81 acts to elevate the lever 171, and the counterweight 180 simultaneously swings the detent 172 into the retracted position shown in Fig. 7.

In a manner that will be explained later, the plate 136, during its inward and return swinging movement to effect release of a record, will lift the tone arm C from its rest 42 and set it in position for the stylus to engage the pick-up groove on the outer edge of the record. As the tone arm swings into playing position in response to tracking of the stylus on the counterweight 58 becomes effective to counterbalance the weight of the forward end of the tone arm C so as to lighten the pressure of the stylus on the record.

As the tone arm stylus completes its traverse of the recording grooves and follows the rapidly decreasing spiral inwardly of the recording grooves, the feeler 50 which has been swinging concurrently with the tone arm C comes into contact with the finger 196 on the tripper 138. If the surface 193.1 of the cam 193 of the tripper 138 is in contact with the cam quadrant 143, as shown in Fig. 10, the feeler 50 momentarily will be ineffective to swing the tripper 138 on its pivot 192. However, by reason of the frictional engagement of the feeler 50 with the tone arm collar 46, the tone arm C will continue its inward swing, thus holding the feeler 50 in contact with the finger 196 until the tripper 138 has been released from the cam quadrant 143. Thereupon the subsequent engagement of the tripper cam 193 by the shoulder 145 will cause the tripper 138 to initiate a swinging of the plate 136 as hereinbefore explained in connection with actuation of the mechanism G. If, on the other hand, the feeler 50 contacts the finger 196 of the tripper 138 when it is not immobilized by the cam quadrant 143, the tripper 138 will be immediately swung on its pivot 192 to bring the cam end 193 into the path of the shoulder 145. Thereupon the tripper 138 will be actuated to initiate a swinging of the plate 136, as hereinbefore explained, to enter the cam track follower 161 into the opening 148 to the cam track 142.

As the turntable B continues its rotation, the cam track follower 161 on the lever 136 follows the path indicated by the arrows in Fig. 4 which is an under side view of the turntable cam 55. From this figure it will be noted that the cam track follower 161, after about a half revolution of the turntable B, begins to move spirally inwardly to the inner portion 142.2 of the cam track 142. As the follower 161 completes its inward travel the shoulder 184.1 on the lever 173 contacts the tripper 138 and restores it to its normal position preparatory to its subsequent activation to again initiate a shifting of the plate 136 to engage the follower 161 with the cam track 142. After the cam track follower 161 has completed approximately a full revolution of the turntable cam 55, the follower 161 begins to move spirally outwardly into the outer portion 142.1 of the cam track 142 toward the discharge opening 149.

During this traversing of the cam track 142 the cam track follower 161 is also being gradually depressed. At the high point of its depression the cam track follower 161 is traversing that portion of the cam track 142 formed in the shiftable section 151. As the cam track follower 161 approaches the end of its travel in the inner portion 142.2 of the cam track 142, the follower 161 retracts the cam track section 151 so as to permit the cam track follower 161 to move through the underpass and out into the outer portion 142.1 leading to the exit 149.

The depression of the cam track follower 161 by the high point of the cam track 142 causes a rocking of the plate 136 on the embossments 156 and elevates the extension 162 so as to contact the pin 59 of the tone arm C. As a result, the tone arm is tilted to move the stylus out of contact with the record. As the cam track follower 161 moves through the second half of the inner cam track portion 142.2, and approaches the section 151, the plate 136 is swung in a horizontal plane on the pin 157. This results in bringing the ledge 163 on the extension 162 in contact with the pin 59 on the tone arm C. As this extension is moved outwardly, the pin 59 is moved into contact with the ledge 163 and becomes seated in the groove 163.1. As a consequence the tone arm is shifted outwardly toward its starting position, and with the return inward movement of the extension 162 the tone arm is swung into a position for lowering the stylus into contact with the pickup groove in the record when the extension is retracted from its contact with the pin 59. The elevation of the tone arm C, incident to its being returned to starting position, swings the rear end of the tone arm downwardly and brings the finger 73 into contact with the hub 57. The weight 58 is consequently rendered inactive as a counterbalance for the tone arm C, with the result that the full weight of the tone arm, forwardly of the hinge pin 60, holds the pin 59 in firm contact with the plate extension 162.

As already explained, the initial inward movement of the plate 136 causes the finger 173 to shift the detent 172 to move the cam roller 179 into contact with the cam track 141. Hence, during the travel of the cam track follower 161 around the first revolution of the cam track 142, the cam track 141 is effective for release of a record R from the record support and release mechanism D.

As the cam track follower 161 travels from the inner portion 142.2 of the cam track 142 to the outer portion 142.1, it not only swings the plate 136 to move the tone arm C inwardly toward the record, but by reason of the receding character of the cam track 142 it permits the spring 159 (see Fig. 12) to exert a pressure to restore the plate 136 to its normal position with the lug 158 in contact with the base 31. As the cam track follower 161 approaches the exit opening 149 of the cam track 142, the tone arm C is poised in starting position over the record that has been released for positioning on the turntable as the plate 136 initiated the elevation and retraction of the tone arm C. As the cam track follower 161 is released from the cam disc 55, the spring 159 consummates the restoration of the plate 136 to its normal position and frees the pin 59 from the plate extension 162 so that the tone arm stylus will engage the record. Thereupon the counterweight 58 is effective as a counterbalance to the weight of the tone arm C forwardly of its support on the post 34, with the resultant light contact of the stylus with the record.

The subject matter herein claimed was first disclosed in my application filed December 15, 1949, Serial No. 133,168, now abandoned, of which this case is a division.

I claim:

1. In a phonograph, the combination of a supporting base, a record-supporting turntable journaled for rotation on the base, a motor mounted on the base and connectable to rotate the turntable, a tone arm oscillatingly mounted on the base to traverse a record on the turntable, a plate mounted intermediately its ends on the base to swing in a horizontal plane on a vertical axis and tilt in a vertical plane on a horizontal axis, a cam member associated with the turntable and having a track formed in the face thereof to effect horizontal and vertical movements and provided with peripheral entrance and exit openings, a cam track follower on one end of the plate adapted to traverse the cam track to effect a tilting and swinging of the plate, means on the other end of the plate adapted to engage the tone arm to elevate the same and carry it to starting position when the plate is tilted and swung as a result of engagement of the follower with the cam track, and tripper means actuated by the tone arm as it approaches the limit of its inward movement to shift the plate horizontally to move the cam track follower through the peripheral entrance opening to initiate engagement of the cam track follower with the cam track whereby the plate is actuated by said cam member to return the tone arm to starting position and to eject the cam track follower through the peripheral exit opening.

2. In a phonograph, the combination of a supporting base, a record-supporting turntable journaled for rotation on the base, a motor mounted on the base and connectable to rotate the turntable, a tone arm oscillatingly mounted on the base to traverse a record on the turntable, a plate mounted intermediately its ends on the base to swing in a horizontal plane on a vertical axis and tilt in a vertical plane on a horizontal axis, a cam member associated with the turntable and having a track formed therein and comprising opposite spirals extending inwardly from adjacent openings on the periphery of said cam member and one underpassing the other substantially opposite their juncture and said peripheral openings adapted to effect horizontal and vertical movement, a cam track follower on one end of the plate adapted to traverse the cam track to effect a tilting and swinging of the plate, a section of said cam member embodying a portion of the cam track over said underpass being retractible to permit the cam track follower to traverse the underpass section of the cam track after having traversed the track over said underpass section, means on the other end of the plate adapted to engage the tone arm to elevate the same and carry it to starting position when the plate is tilted and swung as a result of engagement of the follower with the cam track, and tripper means actuated by the tone arm as it approaches the limit of its inward movement to shift the plate to initiate engagement of the cam track follower with the cam track whereby the plate is actuated by said cam member to return the tone arm to starting position.

3. In a phonograph, the combination of a supporting base, a record-supporting turntable journaled for rotation on the base, a motor mounted on the base and connectable to rotate the turntable, a tone arm oscillatingly mounted on the base to traverse a record on the turntable, a plate mounted intermediately its ends on the base to swing in a horizontal plane on a vertical axis and tilt in a vertical plane on a horizontal axis, a cam member associated with the turntable and having a track formed therein and comprising opposite spirals extending inwardly from adjacent openings on the periphery of said cam member and one underpassing the other substantially opposite their juncture and said peripheral openings adapted to effect horizontal and vertical movements, a cam track follower on one end of the plate adapted to traverse the cam track to effect a tilting and swinging of the plate, a section of said cam member embodying a portion of the cam track over said underpass being retractible to permit the cam track follower to traverse the underpass section of the cam track after having traversed the track over said underpass section, a spring normally urging said cam member section into position over said underpass, means on the other end of the plate adapted to engage the tone arm to elevate the same and carry it to starting position when the plate is tilted and swung as a result of engagement of the follower with the cam track, and tripper means actuated by the tone arm as it approaches the limit of its inward movement to shift the plate to initiate engagement of the cam track follower with the cam track whereby the plate is actuated by said cam member to return the tone arm to starting position.

4. In a phonograph, the combination of a supporting base, a record-supporting turntable journaled for rotation on the base, a motor connectable to rotate the turntable, a tone arm oscillatingly mounted on the base to traverse a record on the turntable, an angularly-shaped plate journaled on the base on a vertical axis to swing in a horizontal plane, embossments formed on the plate on opposite sides of said journaled connection and slidingly supporting the plate on the base to tilt in a vertical plane about a horizontal axis concurrently with its horizontal swinging, a shouldered ledge and cam track follower formed on the plate at opposite sides of said journaled connection, resilient means normally urging the plate to retract the shouldered ledge and cam track follower, a cam member associated with the turntable and having a track adapted to effect horizontal and vertical movements, tripper means actuated by the tone arm as it approaches the limit of its inward movement to shift the plate to bring the cam track follower into engagement with the cam track whereby the plate is tilted and swung in vertical and horizontal planes, and means on the tone arm adapted to be contacted by the shouldered ledge so as to retract the tone arm to starting position by the swinging-tilting movement of said plate.

5. In a phonograph, the combination of a supporting base, a record-supporting turntable journaled for rotation on the base, a motor connectable to rotate the turntable, a record-supporting spindle concentrically arranged above the turntable, a rod telescopically arranged on the spindle and extending below the turntable, a pair of vertically-spaced record-engaging elements on the spindle, coacting means on the rod and spindle for effecting an opposite shifting of said elements radially of the spindle during relative movement of the spindle and rod to release records one at a time for positioning on the turntable, a tone arm oscillatingly mounted on the base to traverse a record on the turntable, a plate mounted intermediate its ends on the base to swing in a horizontal plane about a vertical axis and tilt in a vertical plane about a horizontal axis, a cam member on the under side of the turntable having a hub concentrically disposed with respect to the spindle, a vertically-descending cam track formed on the hub with the surface of the track inclined radially upwardly, a second cam track formed on said cam member outwardly of the hub and comprising opposite downwardly-descending spirals extending inwardly from adjacent openings on the periphery of said cam member and one underpassing the other substantially opposite their juncture and said peripheral openings, a cam track follower on the plate adapted to traverse said last-mentioned cam track to effect a tilting and swinging of the plate, a section of said cam member embodying a portion of said last-mentioned cam track over said underpass being retractible to permit the cam track follower to traverse the underpass section of the cam track after having traversed the track in said section, a spring normally urging said cam track section to dispose the cam track therein over the underpass section of said track, means on the outer end of the plate adapted to engage the tone arm to elevate the same and swing it to starting position when the plate is tilted and swung as a result of engagement of the follower with said second-mentioned cam track, tripper means actuated by the tone arm as it approaches the limit of its inward movement to shift the plate to initiate engagement of the cam track follower with said second-mentioned cam track whereby the plate is actuated to return the tone arm to starting position, a detent hinged on the base and connected to the rod, a cam roller with tapered periphery to fit the incline of said first-mentioned cam track mounted on the detent to swing from a normally retracted position into engagement with said first-mentioned cam track, and a finger on the plate for shifting said detent to engage the cam roller with said first-mentioned cam during initial movement of the plate whereby the rod is actuated to effect release of a record during return movement of the tone arm.

6. In a phonograph, the combination of a supporting base, a record-supporting turntable journaled for rotation on the base, a motor connectable to rotate the turntable, a tone arm oscillatingly mounted on the base to traverse a record on the turntable, an angularly shaped plate journaled on the base to swing in a horizontal plane, embossments formed on the plate on opposite sides of the journal connection and slidingly supporting the plate on the base to tilt in a vertical plane about a horizontal axis concurrently with its horizontal swinging, an arcuate shaped extension and a cam track follower formed on the plate at opposite sides of said journal connection, a contiguous shoulder and a groove formed in the extension and disposed radially of the journaled connection, resilient means normally urging the plate to retract the extension and the cam track follower, a cam member associated with the turntable and having a track adapted to effect horizontal and vertical movements, tripper means actuated by the tone arm as it approaches the limit of its inward movement to shift the plate to bring the cam track follower into engagement with the cam track whereby the plate is tilted and swung in vertical and horizontal planes, and a pin on the tone arm adapted to be contacted by said extension whereby the tone arm is lifted from traversing a record and retracted to a position beyond the periphery of a record, whereupon said pin becomes seated in said groove so as to return the tone arm to a starting position by the final swinging-tilting action of the plate.

COLIN B. DALE.

REFERENCES CITED

The following references are of record in the file of this patent:

UNITED STATES PATENTS

| Number | Name | Date |
| --- | --- | --- |
| 1,942,864 | La Rue | Jan. 9, 1934 |
| 2,509,811 | Dale | May 30, 1950 |